United States Patent
Okabe

(10) Patent No.: US 9,239,094 B2
(45) Date of Patent: Jan. 19, 2016

(54) FACE GEAR AND GEAR DEVICE

(71) Applicant: AISIN SEIKI KABUSHIKI KAISHA, Kariya-shi (JP)

(72) Inventor: Yuki Okabe, Kakamigahara (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/369,900

(22) PCT Filed: Jan. 21, 2013

(86) PCT No.: PCT/JP2013/051055
§ 371 (c)(1),
(2) Date: Jun. 30, 2014

(87) PCT Pub. No.: WO2013/114990
PCT Pub. Date: Aug. 8, 2013

(65) Prior Publication Data
US 2014/0326095 A1 Nov. 6, 2014

(30) Foreign Application Priority Data
Jan. 30, 2012 (JP) .................................. 2012-016906

(51) Int. Cl.
*F16H 57/04* (2010.01)
*F16H 1/16* (2006.01)
(Continued)

(52) U.S. Cl.
CPC .................. *F16H 1/16* (2013.01); *F16H 1/125* (2013.01); *F16H 57/0431* (2013.01);
(Continued)

(58) Field of Classification Search
CPC ..... F16H 1/16; F16H 1/125; F16H 2055/173; F16H 57/0431; F16H 57/0464; F16H 57/0495; F16H 57/0434; F16H 57/0498; F16H 57/045; F16H 57/048
USPC ............................................ 74/416, 467, 468
See application file for complete search history.

(56) References Cited

U.S. PATENT DOCUMENTS 3,424,022 A * 1/1969 Greenberg ...................... 74/409
3,516,298 A * 6/1970 Arndt ............................. 74/427
(Continued)

FOREIGN PATENT DOCUMENTS

EP 0 278 361 A2 8/1988
JP S 58-14543 1/1983
(Continued)

OTHER PUBLICATIONS

International Preliminary Report on Patentability and Written Opinion issued on Aug. 5, 2014, in Patent Application No. PCT/JP2013/051055.
(Continued)

*Primary Examiner* — William Kelleher
*Assistant Examiner* — Gregory Prather
(74) *Attorney, Agent, or Firm* — Oblon, McClelland, Maier & Neustadt, L.L.P.

(57) ABSTRACT

This face gear has a plurality of annularly arranged gear teeth. A recess for holding grease or another lubricant is formed in the tooth surface of each gear tooth. A recess forming area, which is the area in which the recess is formed, is provided between the tooth bottom and the pitch point in each gear tooth. In other words, a recess is not formed in the part of the tooth surface that is located between the tooth tip and the pitch point. As a result, the gear teeth can be effectively lubricated while minimizing instability in the meshing state between gears.

7 Claims, 3 Drawing Sheets

(51) Int. Cl.
*F16H 1/12* (2006.01)
*F16H 55/17* (2006.01)

(52) U.S. Cl.
CPC ....... *F16H 57/0464* (2013.01); *F16H 57/0495* (2013.01); *F16H 2055/173* (2013.01); *Y10T 74/19642* (2015.01); *Y10T 74/19828* (2015.01)

(56) References Cited

U.S. PATENT DOCUMENTS

| | | | | |
|---|---|---|---|---|
| 3,695,119 | A | * | 10/1972 | Stade ............................... 74/427 |
| 4,273,002 | A | * | 6/1981 | Ogasawara et al. ............. 74/462 |
| 6,128,969 | A | * | 10/2000 | Litvin et al. .................... 74/458 |
| 2008/0168854 | A1 | * | 7/2008 | Iwano ....................... 74/388 PS |

FOREIGN PATENT DOCUMENTS

| | | |
|---|---|---|
| JP | 10-203436 A | 8/1998 |
| JP | 11 182652 | 7/1999 |
| JP | 2002 233276 | 8/2002 |
| JP | 2003-207031 | 7/2003 |
| JP | 2004-92697 | 3/2004 |
| JP | 2004 211763 | 7/2004 |
| JP | 2005-517139 | 6/2005 |
| JP | 2008-2597 | 1/2008 |
| JP | 2009 74663 | 4/2009 |
| JP | 2009 74666 | 4/2009 |
| JP | 2010 75075 | 4/2010 |
| JP | 2011-127722 | 6/2011 |
| JP | 2011 144837 | 7/2011 |
| JP | 2011-185370 | 9/2011 |

OTHER PUBLICATIONS

International Search Report Issued Mar. 12, 2013 in PCT/JP13/051055 Filed Jan. 21, 2013.
Extended European Search Report issued Sep. 24, 2015 in Patent Application No. 13743305.8.
Office Action issued Oct. 13, 2015 in Japanese Patent Application No. 2012-016906 (with English translation).

* cited by examiner

0
FACE GEAR AND GEAR DEVICE

FIELD OF THE INVENTION

The present invention relates to a face gear and a gear device.

BACKGROUND OF THE INVENTION

In a face gear, which has annularly arranged gear teeth, lubrication of the gear teeth, which contact an associated gear meshing with the face gear, is an important task. For example, Patent Document 1 discloses a structure in which the surfaces of each tooth have steps for retaining lubricant. Patent Document 2 discloses a structure in which a groove for retaining lubricant is formed in the tooth bottom. Patent Document 3 discloses a structure in which a lubricant retaining portion is formed in a radially outer portion of each gear tooth.

Patent Document 4 discloses a structure of a gear with gear teeth. An associated gear moves along a part of the tooth surface of each gear tooth while making rolling contact. A recess for retaining lubricant is formed in the part contacting the associated gear. That is, when the face gear rotates, the parts contacting the associated gear moves diagonally along each tooth surface of the face gear. Since the lubricant retaining portions are formed at parts of the tooth surfaces that correspond to the paths of the contacting portions, which are moving, each gear tooth can be effectively lubricated.

PRIOR ART DOCUMENTS

Patent Documents

Patent Document 1: Japanese Laid-Open Patent Publication No. 2002-233276
Patent Document 2: Japanese Laid-Open Patent Publication No. 2010-75075
Patent Document 3: Japanese Laid-Open Patent Publication No. 2009-74666
Patent Document 4: Japanese Laid-Open Patent Publication No. 2009-74663

SUMMARY OF THE INVENTION

However, in a configuration of a face gear that has steps or recesses in parts that contact an associated gear, the meshing state with the associated gear may be unstable. To avoid the drawback, a lubricant retaining portion may be formed at a part that is away from the parts that directly contact the associated gear, for example, at the tooth bottom. However, such a structure may lead to shortage of supply of lubricant.

Accordingly, it is an objective of the present invention to provide a face gear and a gear device that are capable of effectively lubricating gear teeth while suppressing instability of the meshing state.

To achieve the foregoing objective and in accordance with one aspect of the present invention, a face gear including a plurality of annularly arranged gear teeth is provided. Each gear tooth has a tooth surface, a tooth bottom, and a tooth tip. The tooth surface has a recess for retaining lubricant. A recess forming area, in which the recess is formed, is located between the tooth bottom and a pitch point of the gear tooth.

Since the recess for retaining lubricant is formed in the tooth surface, each tooth is effectively lubricated. This reduces the frictional resistance of the tooth surface, so that the gear efficiency and the quietness are improved. However, to stabilize the meshing state of gears, the part of the tooth surface that is located between the tooth tip and the pitch point is preferably flat and smooth. In this regard, the above described configuration has no recesses in the part of the tooth surface that is located between the tooth tip and the pitch point. It is thus possible to effectively lubricate the gear teeth while suppressing instability of the meshing state.

DETAILED DESCRIPTION OF THE PREFERRED EMBODIMENTS

Hereinafter, a preferred embodiment of the present invention will be described with reference to drawings.

Figure 1:
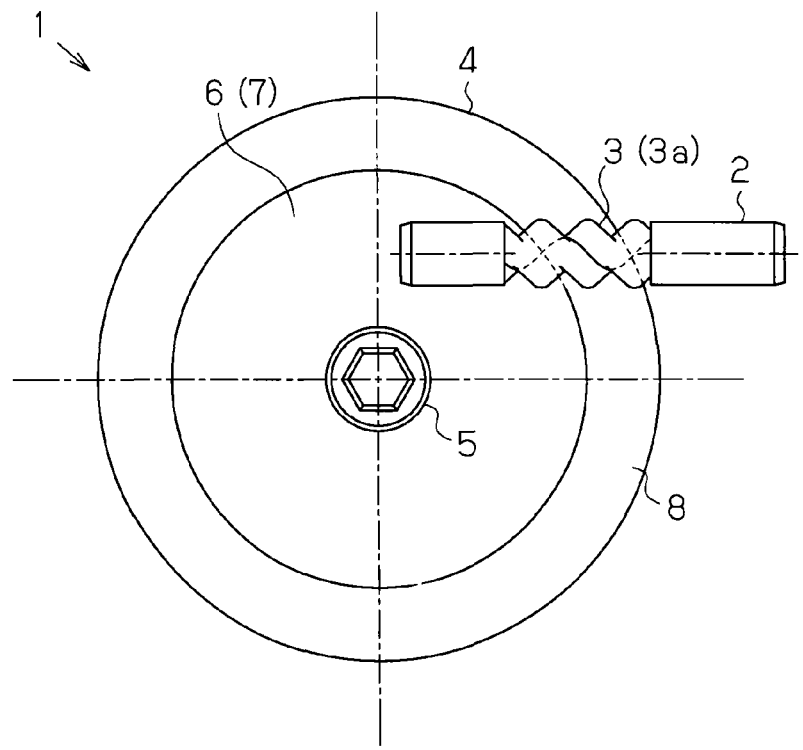
FIG. 1 is a plan view illustrating a gear device according to one embodiment of the present invention.

As shown in FIG. 1, a gear device 1 includes an input gear 3 formed on an input shaft 2 and a face gear 4 meshing with the input gear 3.

The face gear 4 includes a disk portion 6, which has a rotary shaft 5 at the center, and gear teeth 8, which are annularly arranged on a face 7 of the disk portion 6. In the present embodiment, the face gear 4 is arranged such that the rotary shaft 5 is at a skewed position with respect to the input shaft 2. The input gear 3, which is an associated gear, is a pinion gear having a diameter smaller than that of the face gear 4.

Figure 2:
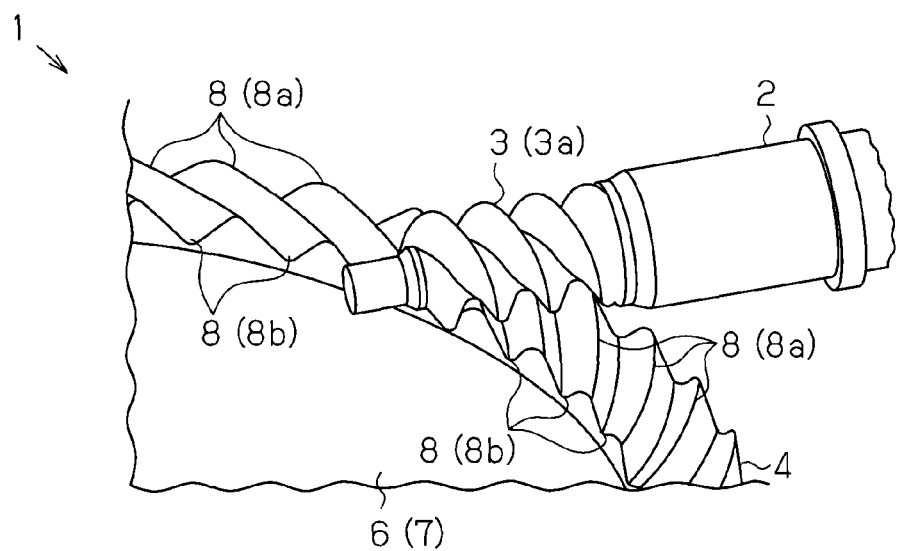
FIG. 2 is a perspective view illustrating a meshing portion between the face gear and the input gear of the gear device shown in FIG. 1.
Figure 3:
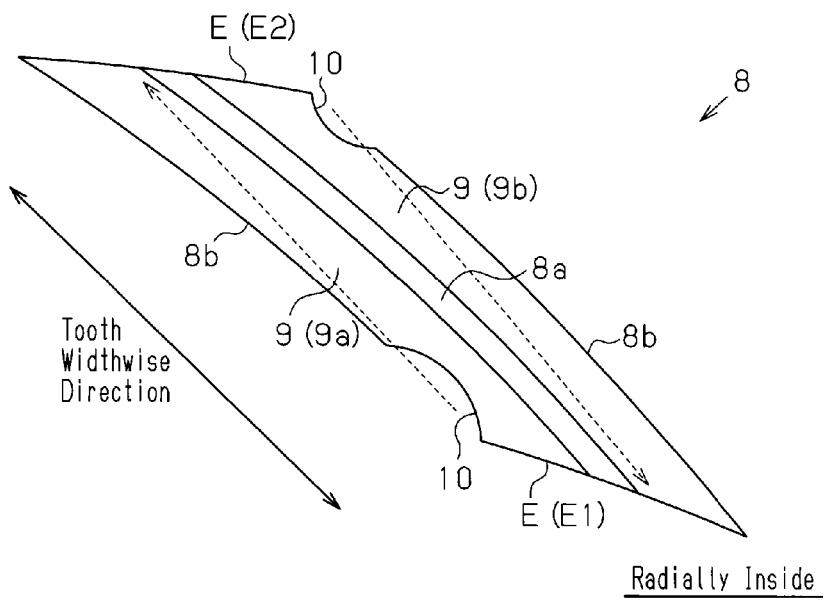
FIG. 3 is a plan view of a gear tooth of the face gear shown in FIG. 2.

As shown in FIG. 2, the gear teeth 8 of the face gear 4 are formed at the periphery of the disk portion 6 such that tooth tips 8a protrude in a direction parallel with the rotary shaft 5 (refer to FIG. 1, in the direction perpendicular to the sheet of the drawing). The input gear 3 is a helical gear with a small number of teeth. Specifically, the input gear 3 has two-thread gear teeth 3a, which are twisted in a screw-like manner. Each gear tooth 8 of the face gear 4 extends from the radially inner end to the radially outer end and is diagonal relative to the radial direction. The gear teeth 8 are twisted to make rolling contact with the gear teeth 3a of the input gear 3. As shown in FIG. 3, the radially inner end of each gear tooth 8 will be referred to as a first end E1, and the radially outer end will be referred to as a second end E2. The first end E1 and the second end E2 are ends E in the widthwise direction of the gear tooth 8.

As illustrated in FIG. 3, each gear tooth 8 of the face gear 4 has two curved tooth surfaces 9. One of the tooth surfaces 9 is a concave tooth surface 9a and the other tooth surface 9 is a convex tooth surface 9b. Each tooth surface 9 has a recess 10 for retaining non-illustrated lubricant (for example, grease). Each recess 10 is formed at a part of the corresponding tooth surface 9 that is close to the tooth bottom 8b, and closest to the end E in the tooth widthwise direction, where the tooth surface 9 starts meshing with the input gear 3.

Figure 4:
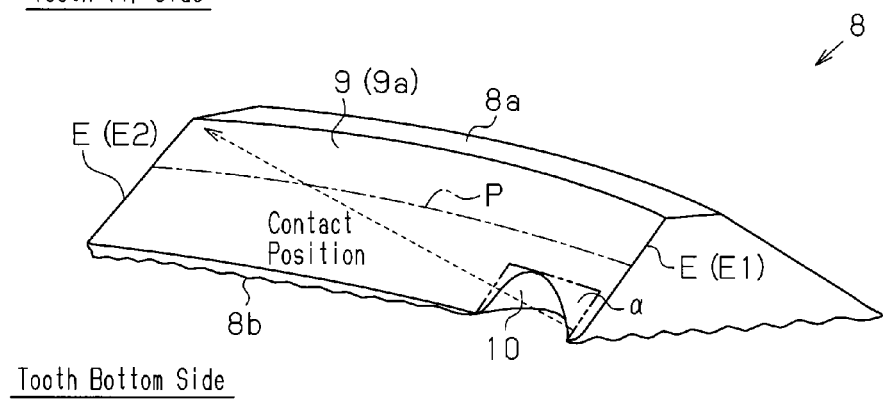
FIG. 4 is a perspective view of the gear tooth shown in FIG. 3.

As illustrated in FIGS. 3 and 4, parts of the face gear 4 of the present embodiment that contact the associated gear (the input gear 3), or the meshing parts, move diagonally on the tooth surfaces 9 of the gear tooth 8. Specifically, on the concave tooth surface 9a, the part that contacts the input gear 3 diagonally moves from a position close to the tooth bottom 8b of the first end E1 at the radially inner end to a position close to the tooth tip 8a of the second end E2 at the radially outer end. On the convex tooth surface 9b, the part that contacts the input gear 3 diagonally moves from a position close to the tooth bottom 8b of the second end E2 at the radially outer end to a position close to the tooth tip 8a of the first end E1 at the radially inner end. That is, the part of each gear tooth 8 that starts meshing with the gear teeth 3a of the input gear 3 is shifted in the tooth widthwise direction according to the rotational direction of the face gear 4. Each recess 10 is formed at the meshing starting position in the corresponding tooth surface 9. That is, in the concave tooth surface 9a, the recess 10 is located in the vicinity of the tooth bottom 8b of the first end E1 at the radially inner end. In the convex tooth surface 9b, the recess 10 is located in the vicinity of the tooth bottom 8b of the second end E2 at the radially outer end.

Figure 5:
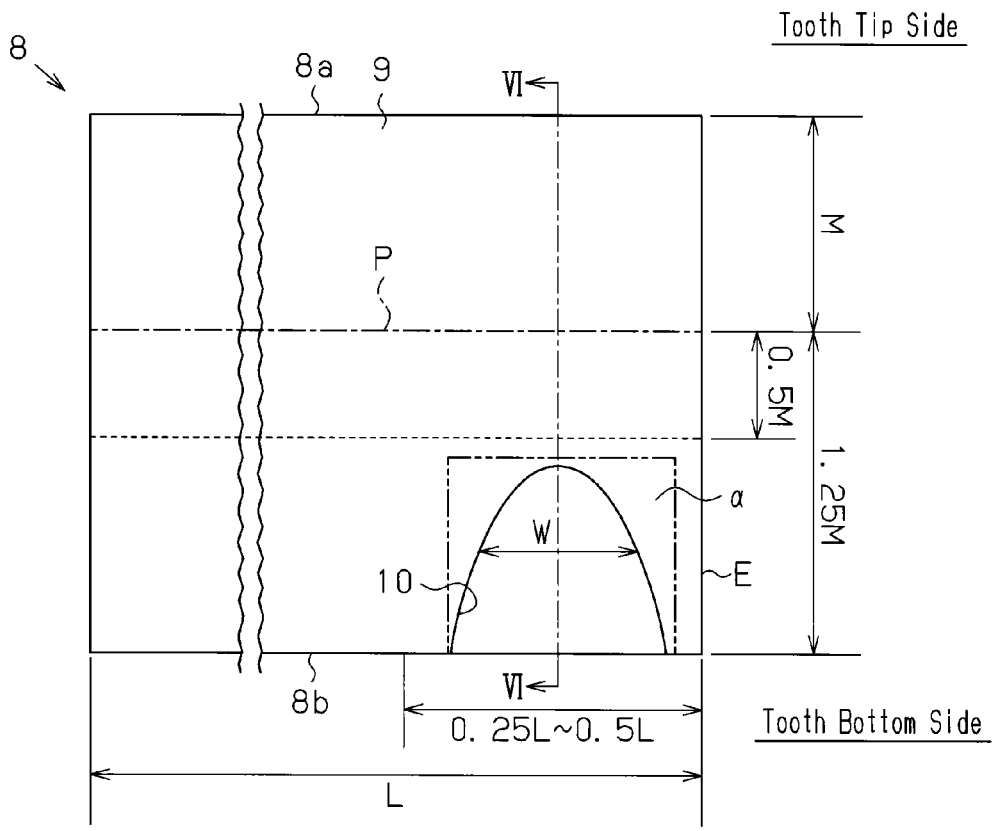
FIG. 5 is an explanatory diagram showing a recess formed in the tooth surface of the gear tooth shown in FIG. 3.

More specifically, in the face gear 4 of the present embodiment, a recess forming area α, in which the recess 10 is formed, is set at a position between the tooth bottom 8b and the pitch point P of the gear tooth 8 (a point on the path indicated by a long dash alternating with a short dash in the drawing) as shown in FIG. 5.

In the present embodiment, the size of the gear tooth 8 is set to be substantially 2.25 modules, and the pitch point P is set at the position separated from the tooth tip 8a by 1 module (1.25 modules from the tooth bottoms 8b). The module (M) is a known value that is obtained by dividing the diameter (R) of the pitch circle by the number (T) of the gear teeth (M=R/T). The recess forming area α is formed between the tooth bottom 8b and a position separated away from the pitch point P toward the tooth bottoms 8b by a distance of 0.5 modules (position indicated by a broken line in FIG. 5). In other words, the recess forming area α is separated away toward the tooth bottom 8b from the pitch point P by a distance greater than 0.5 modules. More specifically, the recess forming area a is located in a range between the tooth bottom 8b and the position separated away from the pitch point P toward the tooth bottom 8b by a distance of 0.5 modules.

When the width of the gear tooth 8 (the lateral length in FIG. 5) is represented by L, the recess forming area α is located in the range between the end E in the tooth widthwise direction, where the tooth surface 9 starts meshing with the input gear 3, and a position separated away from the end E by a distance of 0.25 L to 0.5 L, that is, between the end E and a position separated from the end E by a quarter to half the tooth width L.

Since the recess 10 is formed only on the side of the pitch point P corresponding to the tooth bottom 8b, the meshing state of the gear teeth 3a, 8 is stabilized. Further, since the recess 10 retaining lubricant exists at the position where meshing with the input gear 3 starts, the lubricant on the gear teeth 3a of the input gear 3 at the position corresponding to the recess 10 is applied to the tooth surfaces 9 of the gear tooth 8 as the contacting portions of the gear teeth 3a, 8 move. In the present embodiment, it is thus possible to effectively lubricate the gear teeth 8 while suppressing instability of the meshing state.

Figure 6:
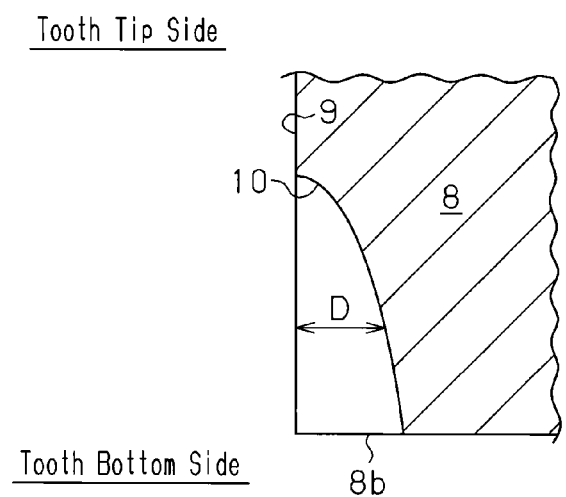
FIG. 6 is a cross-sectional view taken along line VI-VI of FIG. 5.

The recess 10 has a shape that narrows toward the tooth tip 8a, Specifically, the recess 10 is shaped such that the opening width W in the tooth widthwise direction becomes narrower as the distance from the tooth tip 8a decreases. As shown in FIG. 6, the recess 10 is shaped such that the depth D from the tooth surface 9 becomes shallower as the distance from the tooth tip 8a decreases. That is, the recess 10 of the present embodiment is designed such that, as the distance from the tooth tip 8a decreases, the volume (or the cross-sectional area) of the recess 10 decreases.

The present embodiment has the following advantages.

(1) The tooth surface 9 of the gear tooth 8 has the recess 10 for retaining lubricant (such as grease). The recess forming area α, in which the recess 10 is formed, is located between the tooth bottom 8b and the pitch point P of the gear tooth 8.

Since the recess 10 for retaining lubricant is formed in the tooth surface 9, each tooth 8 is effectively lubricated. This reduces the frictional resistance of the tooth surface 9, so that the gear efficiency and the quietness are improved. However, to stabilize the meshing state of gears, the part of the tooth surface 9 that is located between the tooth tip 8a and the pitch point P is preferably flat and smooth. In this regard, the present embodiment has no recesses 10 in the part of the tooth surface 9 that is located between the tooth tip 8a and the pitch point P. It is thus possible to effectively lubricate the gear teeth 8 while suppressing instability of the meshing state.

(2) The recess forming area α is separated from the pitch point P toward the tooth bottom 8b by a distance greater than half the module. That is, regarding the stability of the meshing state, an area about the pitch point P has a great influence. Thus, by not providing the recess forming area α in the vicinity of the pitch point P, the meshing state between the gears can be further stabilized.

(3) A position of each gear tooth 8 of the face gear 4 at which the gear tooth 8 starts meshing with the input gear 3 is located in the vicinity of the tooth bottom 8b and at the end E in the tooth widthwise direction. Since the recess 10 retaining lubricant exists at the position where meshing with the input gear 3 starts, the lubricant on the gear teeth 3a of the input gear 3 at the position corresponding to the recess 10 is applied to the tooth surfaces 9 of the gear tooth 8 as the contacting portions of the gear teeth 3a, 8 move. As a result, the gear teeth 8 are effectively lubricated without forming the recess 10 at a position between the tooth tip 8a and the pitch point P.

(4) The recess forming area α is located in the range between the end E in the tooth widthwise direction, at which meshing with the input gear 3 starts, and a position separated from the end E by a quarter to half the tooth width L. It is thus possible to effectively lubricate the gear teeth 8 while suppressing instability of the meshing state.

(5) The recess 10 has a shape that narrows toward the tooth tip 8a, Such a shape of the recess 10 improves the lubricant retaining performance. This allows the gear teeth 8 to be lubricated for an extended period of time.

(6) A greater volume of the recess 10 is advantageous for the lubricant retaining performance. In the present embodiment, since the single recess 10 is formed in the recess forming area α, the volume of the recess 10 can be maximized to improve the lubricant retaining performance. In addition, the recess 10 can be formed easily.

(7) The input gear 3, which meshes with the face gear 4, is a helical gear, which is twisted in a screw-like manner. Helical gears are suitable for achieving a higher reduction ratio. In the gear device 1, which has such a helical gear, it is particularly advantageous to effectively perform lubrication while stabilizing the meshing state between gears.

The above described embodiment may be modified as follows.

In the above embodiment, the gear teeth 8 of the face gear 4 are formed to be twisted like the gear teeth 3a of the input gear 3, so that the gear teeth 3a, 8 make rolling contact. However, the gear teeth 8 of the face gear 4 and the gear teeth 3a of the input gear 3 may be teeth of spur gears.

In the above illustrated embodiment, the input gear 3 is a helical gear with a small number of teeth. Specifically, the input gear 3 has two-thread gear teeth 3a, which are twisted in a screw-like manner. However, the number of threads of the input gear 3 may be three or more, and alternatively one if possible.

In the above illustrated embodiment, the recess forming area α is separated from the pitch point P toward the tooth bottom 8b by a distance greater than half the module. However, the position of the recess forming area α is not limited to this as long as the recess forming area α is closer to the tooth bottom 8b than the pitch point P.

In the above illustrated embodiment, the recess forming area α is located in the range between the end E in the tooth widthwise direction, at which meshing starts, and a position separated from the end E by a quarter to half the tooth width L. The present invention is not limited to this, but the size of the recess forming area α in the tooth widthwise direction may be changed. For example, a part of the gear tooth 8 between the tooth bottom 8b and the pitch point P may be defined as a recess forming area α over the entire tooth width.

In the above illustrated embodiment, grease (a typical lubricant that has viscosity and fluidity) is used as the lubricant. However, any type of lubricant may be used.

In the above illustrated embodiment, a single recess 10 is formed in a single recess forming area α. However, two or more recesses 10 may be formed in each recess forming area α. Further, the shape of the recess 10 may be changed as necessary in accordance with, for example, a required lubrication performance and a required period of retention of lubricant.

The invention claimed is:

1. A face gear comprising a plurality of annularly arranged gear teeth, wherein
    each gear tooth has a tooth surface, tooth bottom, and a tooth tip,
    the tooth surface has a recess for retaining lubricant, and
    a recess forming area, in which the recess is formed, is located between the tooth bottom and a pitch point of the gear tooth,
    wherein the recess has a shape that narrows toward the tooth tip.

2. The face gear according to claim 1, wherein the recess forming area is separated from the pitch point toward the tooth bottom by a distance greater than half a module.

3. The face gear according to claim 1, wherein, in each gear tooth, a position at which meshing with an associated gear starts is located in the vicinity of the tooth bottom and at an end in a tooth widthwise direction.

4. The face gear according to claim 3, wherein the recess forming area is located in a range between the end in the tooth widthwise direction, at which the meshing starts, and a position separated from the end by a quarter to half a tooth width.

5. The face gear according to claim 1, wherein the recess is a single recess formed in the recess forming area.

6. A gear device comprising the face gear according to claim 1.

7. The gear device according to claim 6, further comprising an associated gear that meshes with the face gear,
    wherein the associated gear is a helical gear.

* * * * *